(12) United States Patent
Rickman et al.

(10) Patent No.: US 11,820,274 B2
(45) Date of Patent: Nov. 21, 2023

(54) APPARATUS AND METHODS FOR OFFLOADING CARGO FROM TANK TRAILERS

(71) Applicant: RPOD TECH, LLC, Springtown, TX (US)

(72) Inventors: Joby Dee Rickman, Springtown, TX (US); Ryan Matthew Swaner, Dallas, TX (US); Galen Jon Childress, Springtown, TX (US)

(73) Assignee: RPOD Tech, LLC, Springtown, TX (US)

( * ) Notice: Subject to any disclaimer, the term of this patent is extended or adjusted under 35 U.S.C. 154(b) by 202 days.

(21) Appl. No.: 17/394,578

(22) Filed: Aug. 5, 2021

(65) Prior Publication Data

US 2022/0041091 A1   Feb. 10, 2022

Related U.S. Application Data

(60) Provisional application No. 63/061,908, filed on Aug. 6, 2020.

(51) Int. Cl.
*B60P 3/22* (2006.01)
*B60P 1/56* (2006.01)
(Continued)

(52) U.S. Cl.
CPC .............. *B60P 3/2245* (2013.01); *B60P 1/56* (2013.01); *B60P 1/60* (2013.01); *B60P 3/225* (2013.01); *B60P 3/24* (2013.01)

(58) Field of Classification Search
CPC .. B60P 3/2245; B60P 1/56; B60P 1/60; B60P 3/225
See application file for complete search history.

(56) References Cited

U.S. PATENT DOCUMENTS

| | | | |
|---|---|---|---|
| 6,533,142 B1 * | 3/2003 | Hynick | B60P 3/2245 222/61 |
| 6,948,887 B1 * | 9/2005 | Yielding | B65G 53/36 406/146 |

(Continued)

*Primary Examiner* — Jason K Niesz
(74) *Attorney, Agent, or Firm* — Marcella M. Bodner; Cole Schotz, P.C.

(57) ABSTRACT

An apparatus and method are provided for offloading cargo from a tank trailer, which has at least interior compartments, to one or more discharge points. The apparatus includes two or more T-connectors each of which is connected, via a valve, to an outlet of a respective one of the interior compartments of the tank trailer. Each T-connector has an axis defined by a pair of opposing arms and, contrary to conventional apparatus and methods, the T-connectors are positioned with their axes oriented perpendicularly or obliquely relative to the length of the tank trailer. Additionally, for each T-connector, a discharge conduit is connected to one of the opposing arms so that all of the discharge conduits extend from the same side of the tank trailer, perpendicularly or obliquely relative to the length of the tank trailer. A blower conduit is also connected to each T-connector, to the other of the pair of opposing arms, and extend from the other side the tank trailer, opposite the discharge conduits. The blower conduits are also connected to at least one blower which provides air flow and pressure. The method involves providing power to the blower(s), and opening the valves to cause the cargo to flow from each of the interior compartments and form multiple flow streams which flow concurrently, along multiple flow paths, to the one or more discharge points. This apparatus and method reduce the time necessary to accomplish offloading the cargo, among other advantages.

20 Claims, 12 Drawing Sheets

(51) Int. Cl.
*B60P 1/60* (2006.01)
*B60P 3/24* (2006.01)

(56) References Cited

U.S. PATENT DOCUMENTS

2014/0353999 A1* 12/2014 Yielding ................. B60P 3/221
                                                    296/24.3
2017/0284559 A1* 10/2017 Lurk ......................... F16K 1/22

\* cited by examiner

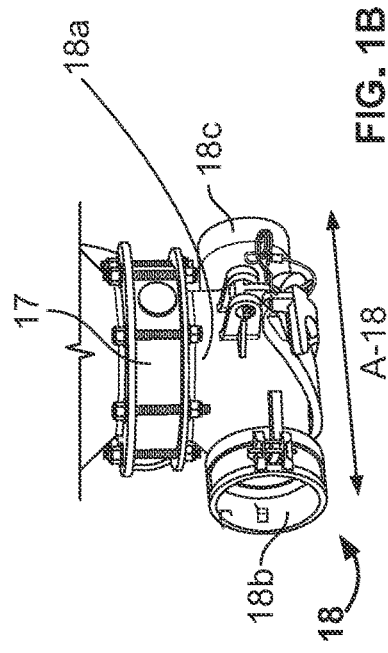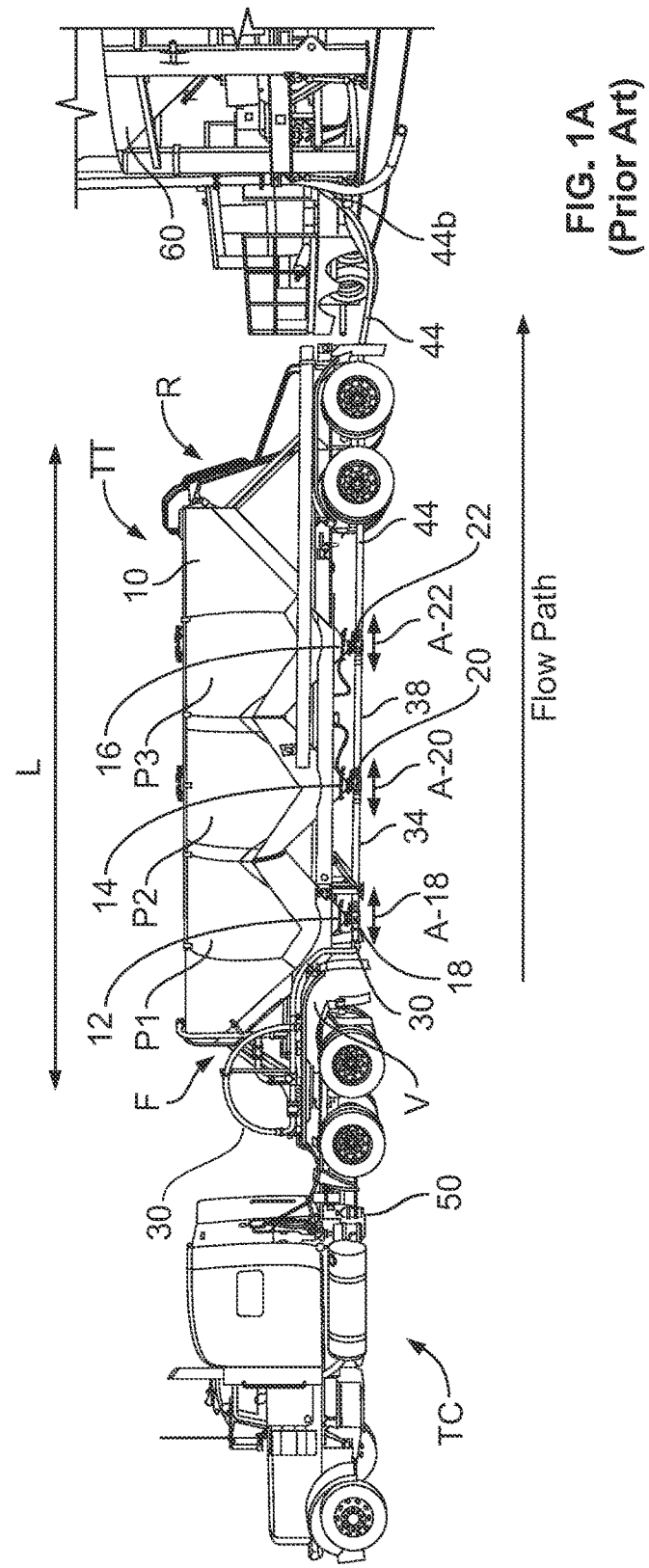

APPARATUS AND METHODS FOR OFFLOADING CARGO FROM TANK TRAILERS

CROSS-REFERENCE TO RELATED APPLICATIONS

The present application claims the benefit of U.S. Provisional Application No. 63/061,908, filed Aug. 6, 2020, the entire disclosure of which is incorporated by reference herein.

FIELD

The invention described and contemplated herein relates generally to apparatus and methods for offloading cargo comprising flowable material from a tank trailer. More particularly, the apparatus and method provided herein allow offloading cargo from tank trailers significantly faster than previously known apparatus and methods.

BACKGROUND

Tank trailers are routinely used in the transport industry for transporting materials, i.e., cargo, which are often flowable solids or liquids, such as construction and industrial materials (cement, sand, asphalt, etc.), food products (e.g., grain, sugar, etc.), and chemicals. In particular, pneumatic trailers are often used to transport such bulk cargo and are generally offloaded using conduits, a pump and forced air.

Tank trailers have at least one tank mounted to a wheeled vehicle frame which supports the tank a distance off the ground. A tank may have one or more interior compartments (sometimes referred to as pods) for holding the cargo therein and which may or may not be discernible from outside the tank.

Each compartment has an outlet for allowing cargo to flow out of the tank. A T-connector and a valve are connected to the tank at each outlet, and conduits are connected to the T-connectors to receive and direct the flow of cargo from the tank. A blower, which is often mounted to the truck chassis but is sometimes instead mounted to the vehicle frame at the front end of the tank trailer, is connected to one of the conduits. In operation, the blower provides air flow and pressure to contain and direct the flow of cargo from the tank and cause the cargo to flow in a desired direction through the conduits. Another one of the conduits has an end which is positioned at or connected to a discharge point (e.g., a silo or another tank) for the offloaded cargo.

When a tank has multiple compartments, the compartments are generally arranged in series, one after the other, from the front end to the back end of the tank trailer and, consequently, the corresponding multiple T-connectors are arranged linearly, under the bottom of the tank, in a line generally parallel to the length of the tank trailer. In conventional practice, several conduits are used to connect the blower to a frontmost T-connector, the T-connectors to one another, and the rearmost T-connector to a discharge point (such as a silo, or another container). In this arrangement, a single cargo flow path is formed which is fed by the outlets of all of the compartments such that the volume of cargo flow from each compartment is combined into a single cargo stream, which must be moved by the blower and is delivered to a single discharge point.

Besides the actual transport time from one place to another, the times required to load or fill the tank and offload or empty the tanks are the next most time-consuming parts of the overall transportation process. Shortening either of these time requirements would be welcomed by industry participants.

Several attempts have been made by industry participants, but none has provided satisfactory improvement to the offloading process. For example, a blower of increased capacity has been employed, a larger diameter product flow path has been formed using larger diameter conduits, and both of the foregoing size increases have been employed together in an attempt to form a single larger capacity offloading system which offloads multiple tank trailers concurrently. Other attempts to improve processes for offloading flowable materials from tank trailers by adding incremental steps and/or pieces of equipment to the process, such as offloading the tank onto a belt which feed a conveyor, that move the cargo throughout the entire system (some portions of which may or may not be pressurized).

The invention described and contemplated herein provides a different, simple and improved solution for improving offloading of cargo from tank trailers by reorienting the T-connectors and employing at least two blowers.

SUMMARY OF THE INVENTION

An apparatus for offloading cargo from a tank trailer to one or more discharge points is provided where the tank trailer has a front and, a rear end, a length extending from the front end to the rear end thereof, and a tank having at least two interior compartments for containing cargo therein, each of the at least two interior compartments having an outlet for allowing cargo to flow out therefrom and a valve connected to the outlet for controlling the flow of cargo through the outlet. The apparatus comprises: at least two T-connectors, each of which has an axis, an intake and a pair of opposing arms in fluid communication with one another and the intake and wherein the pair of opposing arms defines the axis, each of the at least two T-connectors being connected by its intake to the outlet of a respective one of the at least two interior compartments, wherein each of the at least two T-connectors is oriented perpendicularly or obliquely relative to the length of the tank trailer; two or more blower conduits, each of which has a first end and a second end, wherein a respective one of the two or more blower conduits is connected by the first end thereof to a first one of the pair of opposing arms of a respective T-connector, such that the two or more blower conduits all extend away from and on a first side of the tank; at least one blower capable of providing air flow and pressure to the two or more blower conduits, each of which is connected by the second end thereof to the at least one blower for receiving and delivering the air flow and pressure to each of the two or more T-connectors; and two or more discharge conduits, each of which has a first end and a second end, wherein a respective one of the two or more discharge conduits is connected by the first end thereof, and in fluid communication with, a second one of the pair of opposing arms of a respective one of the two or more T-connectors, such that the two or more discharge conduits extend away from and on a second side of the tank which is opposite the first side of the tank.

The second end of each of the two or more discharge conduits may be, directly or indirectly, connected or positioned proximate to the one or more discharge points. The one or more discharge points may, for example, be a silo, a building, a selected location on or in the ground, another tank trailer, a container, a vessel, and combinations thereof.

Each of the two or more discharge conduits concurrently receives and delivers a respective independent cargo stream along a respective independent flow path and to the one or more discharge points. Operation of the at least one blower causes the cargo to flow from each of the two or more interior compartments of the tank, concurrently, along multiple flow paths and in multiple cargo streams, to the one or more discharge points.

When the one or more blowers provide air flow and pressure to the two or more blower conduits, cargo flows concurrently out of each of the at least two interior compartments of the tank, through each respective outlet thereof and valve connected thereto, and forms multiple cargo streams which flow concurrently along multiple flow paths, through the two or more discharge conduits and generally in a desired direction which is, at least initially, perpendicular or oblique relative to the length of the tank.

In some embodiments, the second ends of all of the two or more discharge conduits may be, directly or indirectly, connected or positioned proximate to a single discharge point.

In some embodiments, the at least two interior compartments comprise at least: a frontmost interior compartment which is proximate to the front of the tank trailer and has a foremost outlet a rearmost interior compartment which is proximate to the rear of the tank trailer has a rearmost outlet, and optionally, one or more intermediate interior compartments located between the frontmost and rearmost interior compartments and each of which has a respective intermediate outlet; and the two or more T-connectors comprise at least: a frontmost T-connector which is connected to the frontmost outlet of the frontmost interior compartment, a rearmost T-connector which is connected to the rearmost outlet of the rearmost interior compartment, and, when one or more intermediate interior compartments are present, one or more intermediate T-connectors, each of which is connected to the intermediate outlet of a respective one of the one or more intermediate interior compartments.

In some embodiments, the tank trailer includes a truck chassis and the at least one blower is mounted to the truck chassis. In other embodiments, the at least one blower may be mounted on a wheeled conveyance. For example, without limitation, the at least one blower may comprise two or more blowers, each of which may be mounted on its own separate wheeled conveyance.

A method for offloading cargo from a tank trailer to one or more discharge points using the aforesaid apparatus, when the tank trailer is positioned proximate to the one or more discharge points, comprises the steps of: providing power to the at least one blower and causing the at least one blower to provide air flow and pressure to the two or more blower conduits and the two or more discharge conduits; and opening each of the two or more valves to allow cargo to flow out of each of the at least two interior compartments, through each respective outlet thereof and valve connected thereto, whereby multiple cargo streams are formed and flow concurrently along multiple flow paths, through the two or more discharge conduits, and generally in a desired direction which is, at least initially, perpendicular or oblique relative to the length of the tank. Performing such a method delivers each of the multiple cargo streams is concurrently to the one or more discharge points.

BRIEF DESCRIPTION OF THE FIGURES

FIG. 1A is a schematic side view drawing showing a tank trailer apparatus of the prior art in use to perform a conventional prior art offloading method;

FIG. 1B is a schematic perspective view of a T-connector useful in the apparatus and method of the present invention;

DETAILED DESCRIPTION

Figure 1C:
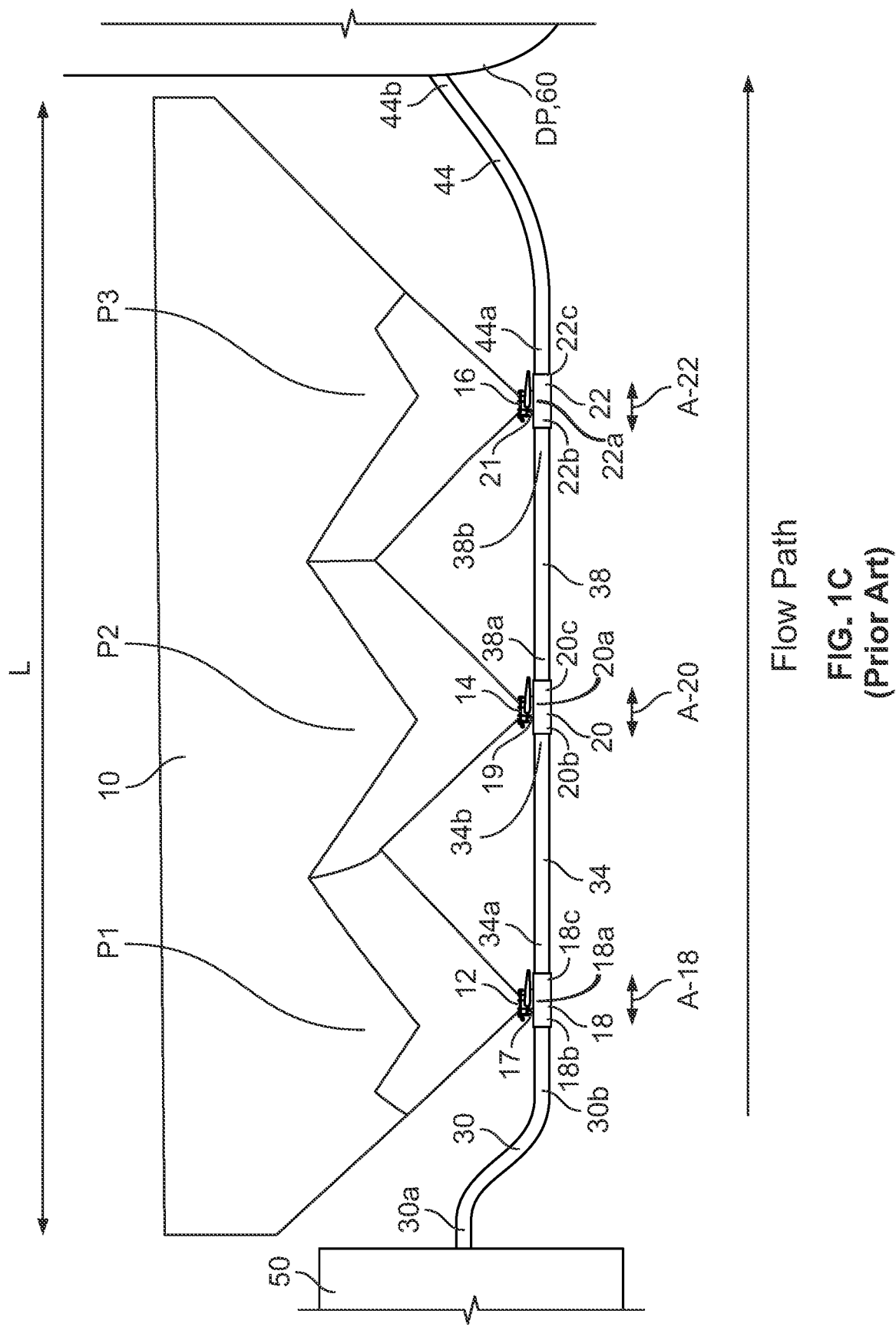
FIG. 1C is a schematic sketch showing a tank having outlets with T-connectors connected thereto and the prior art orientation of the T-connectors to the length of the tank trailer.

The invention described and contemplated herein provides a faster, more efficient, yet simple method for offloading cargo from a tank trailer, as well as apparatus for performing that method. The presently described and contemplated method and apparatus are useful for offloading cargo comprising solid, liquid, or solid and liquid, flowable materials, including but not limited to: cement, fine and coarse gravel, cement, ash, lime, sand, flour, sugar, starch, grain (e.g., corn, wheat, oats, etc.), plastic pellets, industrial alcohols, chemicals (e.g., powder coatings, paint, pigments, glycolic acid, sodium hydroxide, etc.), and combinations thereof. Additionally, while pneumatic tank trailers are frequently used for transporting such flowable materials and the present description focuses on pneumatic trailers, the present invention is not limited to application with pneumatic trailers and may be used with other kinds of tank trailers in addition to pneumatic tank trailers.

As discussed above, and with reference to FIGS. 1A, 1B and 2, a typical tank trailer TT has at least one tank 10 mounted to a wheeled vehicle frame V which supports the tank 10 above the ground thereby providing operators with access to equipment under the tank 10. A tank 10 may have one or more interior compartments (sometimes referred to as pods) P1, P2, P3 for holding cargo (not visible) comprising one or more flowable materials therein and which may or may not be discernible from outside the tank 10. The tank 10 may be made of metal, metal alloy, fiberglass, polymer, and any other material having sufficient structural strength and integrity to contain the cargo and, optionally (depending on the properties of the cargo) having sufficient corrosion resistance to prevent damage to the tank 10 by the cargo. Additionally, the tank 10 may have any shape desired and conducive to holding, transporting and discharging cargo including, without limitation, generally cylindrical, elliptical, conical, rectilinear, and combinations thereof.

Each compartment P1, P2, P3 has an outlet 12, 14, 16 for allowing cargo (not visible) to flow out of the tank 10. A valve 17, 19, 21 and a T-connector 18, 20, 22, respectively, are connected to the tank 10 at each outlet 12, 14, 16, and two-ended conduits 30, 34, 38, 44 are connected to the T-connectors 18, 20, 22 to contain and direct the flow of cargo from the tank 10. A blower 50, which is mounted to the truck chassis TC in this case, is connected to one of the conduits 30. In operation, the blower 50 provides air flow and pressure to assist the flow of cargo from the tank 10 and cause the cargo to flow in a desired direction through the conduits 30, 34, 38, 44. Another one of the conduits 44 has an end 44*b* which is positioned at or connected to a discharge point DP (such as a silo 60) for the offloaded cargo. While the discharge point DP shown in FIGS. 1A and 2 (and others) is a silo 60 at one or more product intake 61, the discharge point DP may be any of various other locations and structures including, without limitation, a building, a selected location on or in the ground, or another container such as another tank, a vessel, a silo, etc.

As will be recognized by persons of ordinary skill in the relevant art, any of the conduits described herein (30, 34, 38, 44 and those shown in other figures, such as conduits 130, 132, 134, 136, 138, 140) may be any suitable device which provides an enclosed flow path for solids, gasses or liquids, such as without limitation, one or more pipes, tubes, hoses, and combinations thereof. Each conduit may, independently, be made from metal, metal alloys, plastic, rubber, polymer, and combinations. As will also be recognized by persons of ordinary skill, each conduit may comprise a single conduit, or two or more conduits connected together to provide a flow path.

The tank trailer TT has a length, indicated by the arrow L, which extends approximately from the front F to the rear R of the tank trailer TT. Where a tank 10 has multiple compartments P1, P2, P3, they are generally arranged in series, one after the other, from the front end F to the rear end R of the tank trailer TT and, consequently, the corresponding multiple T-connectors 18, 20, 22 are arranged linearly, under the bottom of the tank 10, in a line generally parallel to the length L of the tank trailer. With reference briefly to FIG. 1B, each T-connector, such as the foremost T-connector 18, has a flanged intake 18*a* at which it is fluidly connected, indirectly through a valve 17, to its respective compartment outlet 12, and a pair of opposing arms 18*b*, 18*c* which define its axis (see arrow A-18).

As shown more clearly in FIG. 1C which provides an enlarged schematic drawing of the tank 10, its features and several conduits 30, 34, 38, 44 from FIG. 1A, in conventional prior art transport systems and tank trailers TT such as those shown in FIG. 1A, the T-connectors 18, 20, 22 (and valves, 17, 19, 21) are connected to the respective outlets 12, 14, 16 and are oriented with their axes (A-18, A-20, A-22) aligned substantially in parallel with the length L of the tank trailer TT. More particularly, to enable offloading of cargo from such prior art tank trailers TT, a blower conduit 30 is connected by one end 30*a* to the blower 50 and by its opposite end 30*b* to the front-facing arm 18*b* of the foremost T-connector 18. Additionally, one or more intermediate conduits 34, 38 are positioned between and connected by their opposing ends 34*a*, 34*b*, 38*a*, 38*b* to the rear-facing and front-facing arms 18*c*, 20*b*, 20*c*, 22*b* of adjacent T-connectors 18, 20, 22, respectively, and a discharge conduit 44 is connected by one end 44*a* to the rear-facing arm 22*c* of the rearmost T-connector 22 and its other end 44*b* is positioned at or connected to the discharge point DP (e.g., a silo 60).

Figure 2:
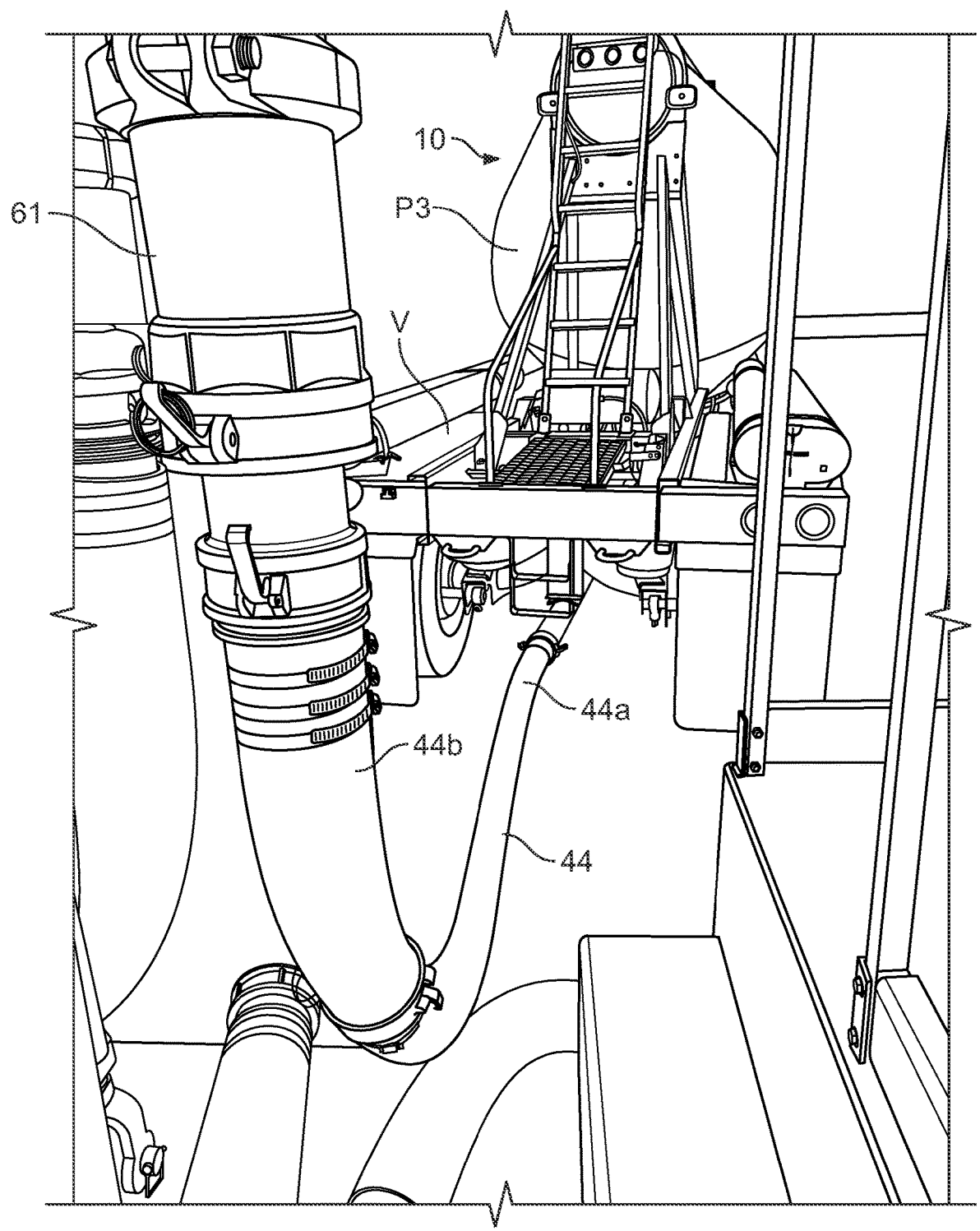
FIG. 2 is a schematic drawing of the prior art apparatus of FIG. 1A from the back view of the tank trailer.

In the foregoing arrangement and orientation of the T-connectors 18, 20, 22 of prior art tank trailers TT shown in FIG. 1A, a single cargo "flow path" (see arrow in FIGS. 1A and 1C) is formed and oriented substantially in parallel with the length L of the tank trailer TT. The single cargo flow path is fed by the outlets 12, 14, 16 of all of the compartments P1, P2, P3, whereby the volume of cargo flow from each compartment P1, P2, P3 is combined into a single cargo stream, all of which must be moved by the blower 50. The single cargo stream is delivered through the discharge conduit 44 and its other end 44*b* to a single discharge point DP (e.g., a silo 60). It is noted that since the flow path for flow and discharge of the cargo from the tank 10 to the discharge point is at the back of the tank trailer 10, to begin offloading in the conventional prior art manner, it is necessary to back the tank trailer and align its rear end R with the intended discharge point (e.g., the silo 60) as shown in FIGS. 1A and 2.

With reference now to FIGS. 3-13, the method according to the invention described and contemplated herein employs a tank trailer TT similar to those used for the conventional prior art methods and apparatus. As shown most clearly in FIGS. 3, 4, 4A, and 9-10, like those described above, the tank trailer TT has a tank 10 mounted on a wheeled vehicle frame V. The tank 10 has one or more (e.g., 2, 3, or 4) interior compartments, or pods P1, P2, P3, each of which has an outlet 12, 14, 16 located on the bottom of the tank 10 for allowing cargo to flow out of the tank 10. Valves 117, 119, 121 and T-connectors 118, 120, 122, which are similar to those described above and used with conventional prior art offloading methods, are each connected to the tank 10 at a respective outlet 12, 14, 16.

Figure 3:
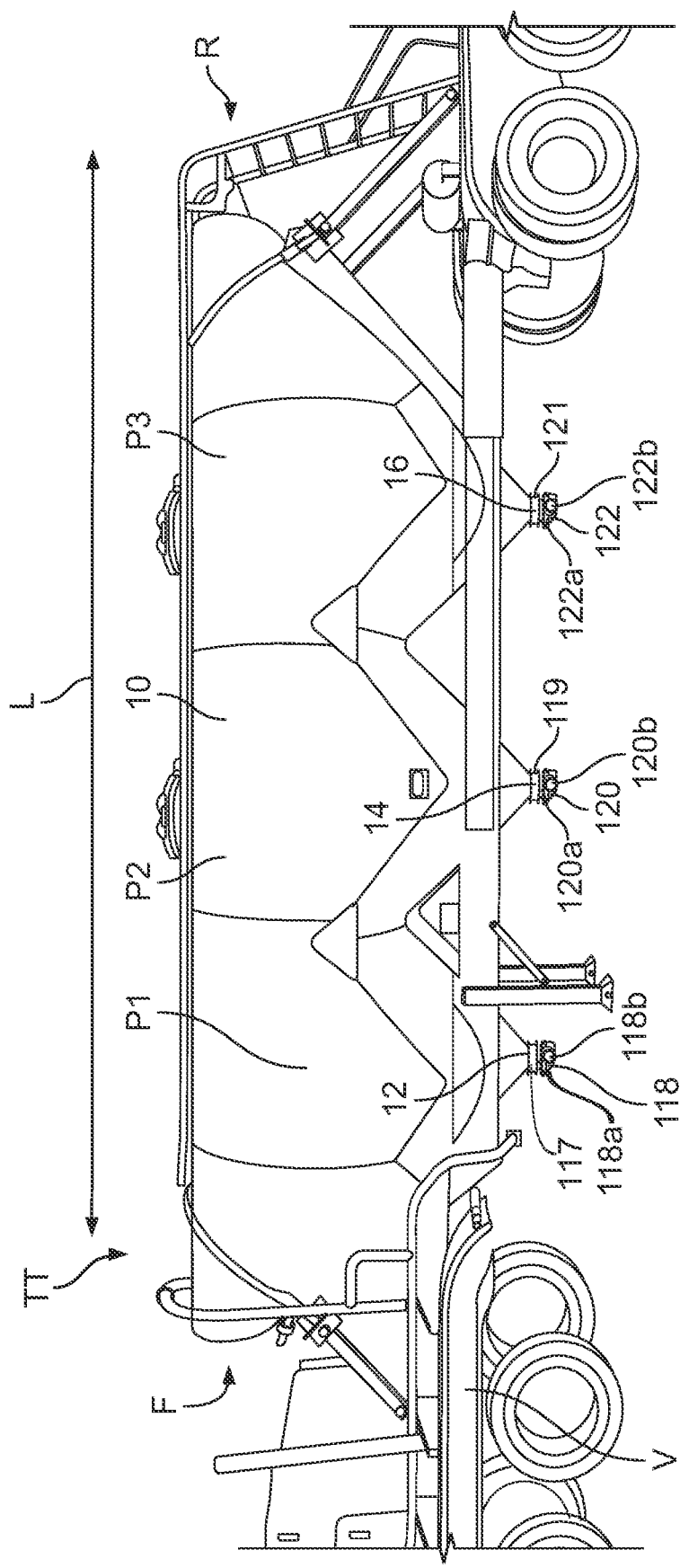
FIG. 3 is a schematic side view drawing of a tank trailer having a tank with outlets and T-connectors connected thereto in an orientation in accordance with an exemplary embodiment of the present invention.
Figure 4:
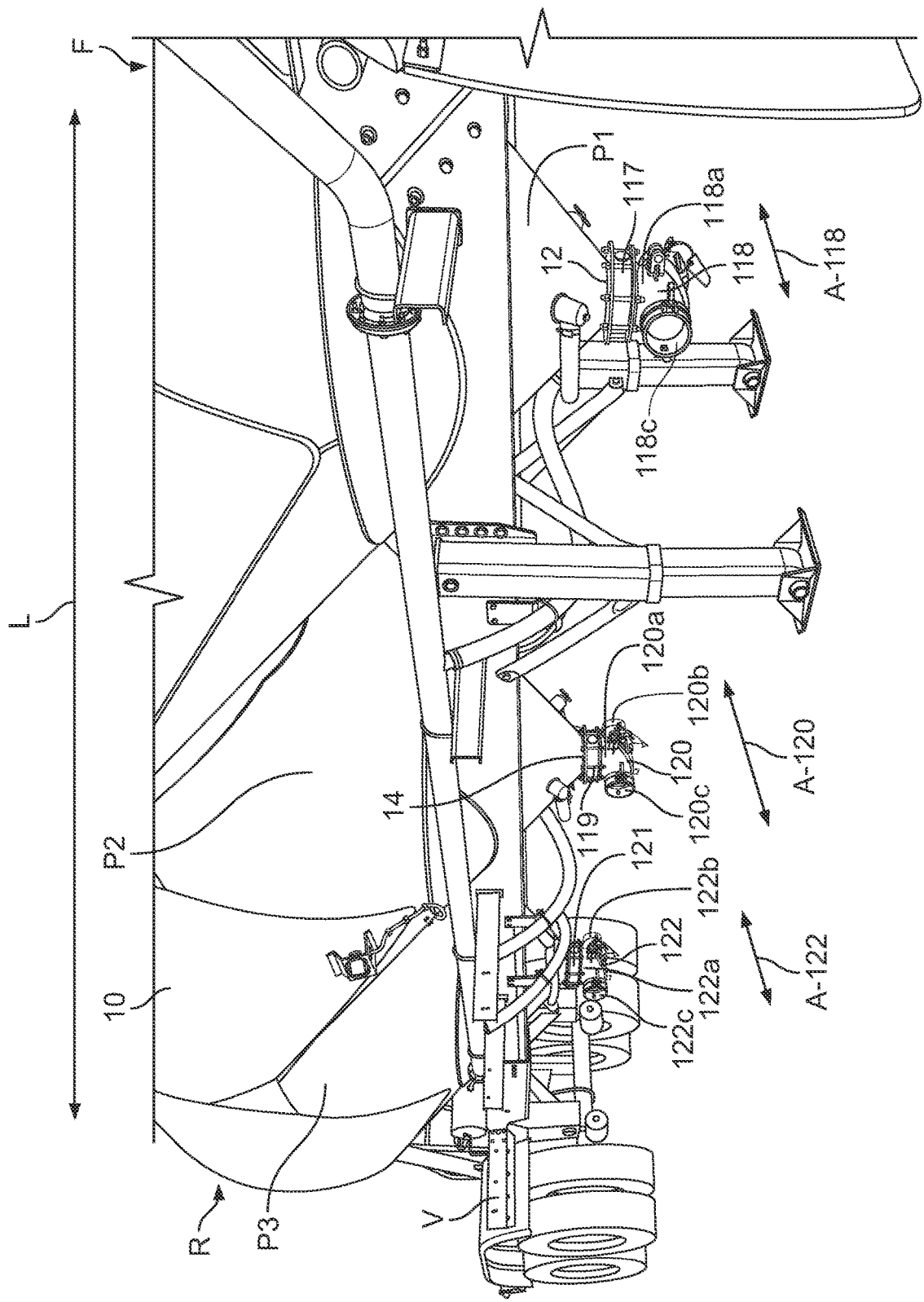
FIG. 4 is a schematic perspective view of the tank trailer of FIG. 3.
Figure 9:
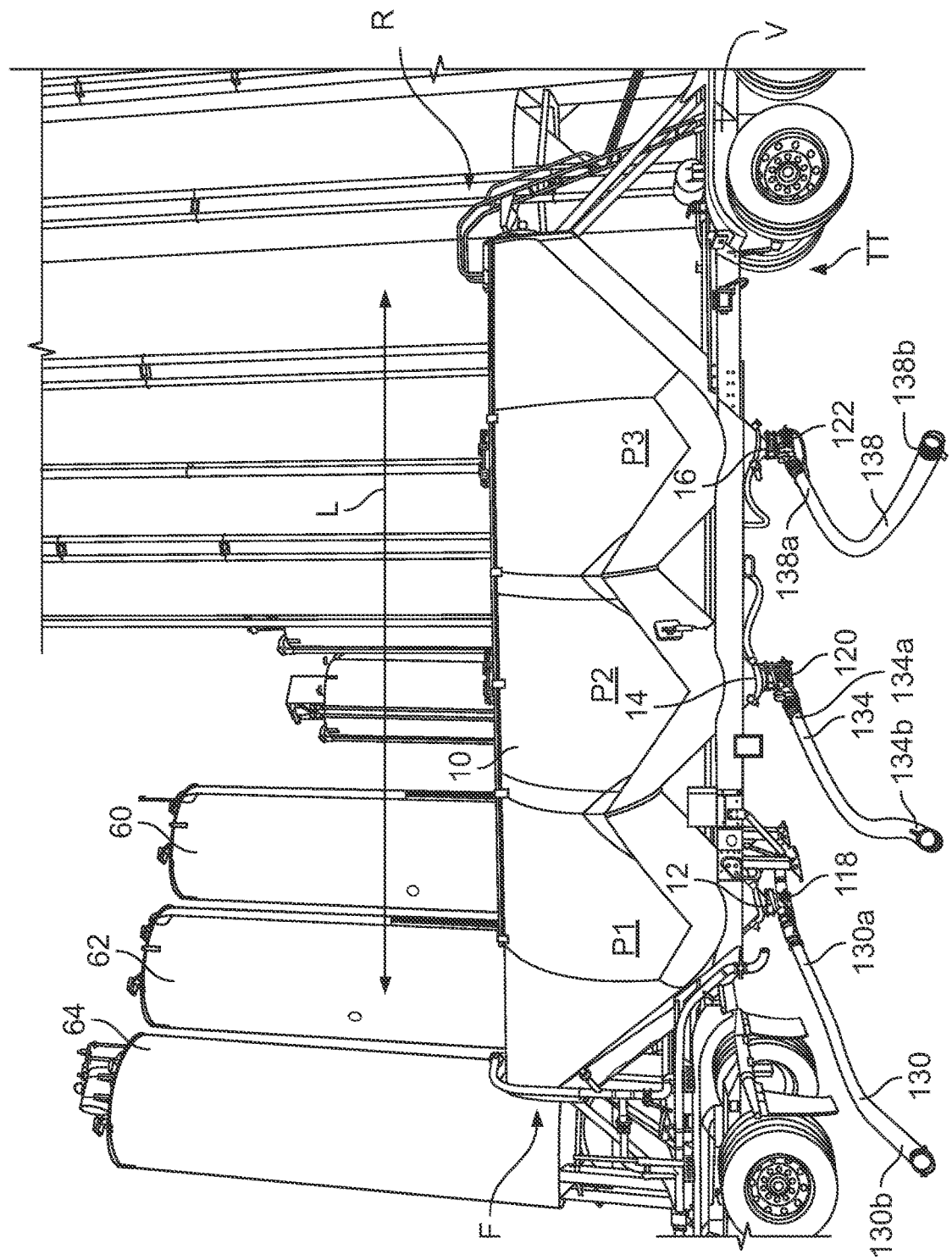
FIG. 9 is a schematic drawing of a tank trailer apparatus and method of its use in accordance with the present invention, wherein blower conduits were connected to T-connectors.

The tank trailer TT has a length, indicated by the arrow L, which extends approximately from the front end F to the rear end R of the tank trailer TT. As shown in FIGS. 3, 4 and 9, the compartments P1, P2, P3 of the tank 10 are still generally arranged in series, one after the other, from the front end F to the rear end R of the tank trailer TT. Consequently, the T-connectors 118, 120, 122 are also still arranged linearly, under the bottom of the tank 10, in a line generally parallel to the length L of the tank trailer. However, as will be described in further detail below, the T-connectors 118, 120, 122 according to the present invention are not oriented parallel, but rather they, are oriented perpendicularly or obliquely with the length L of the tank trailer TT. Additionally, the T-connectors 118, 120, 122 are not connected to one another in series by conduits, and two or more blowers are used, where (i.e., such that) each T-connector 118, 120, 122 and, therefore, the outlet 12, 14, 16 of each compartment or pod P1, P2, P3, is independently connected in parallel to a blower (or to a manifold connected directly to a shared blower).

Figure 5:
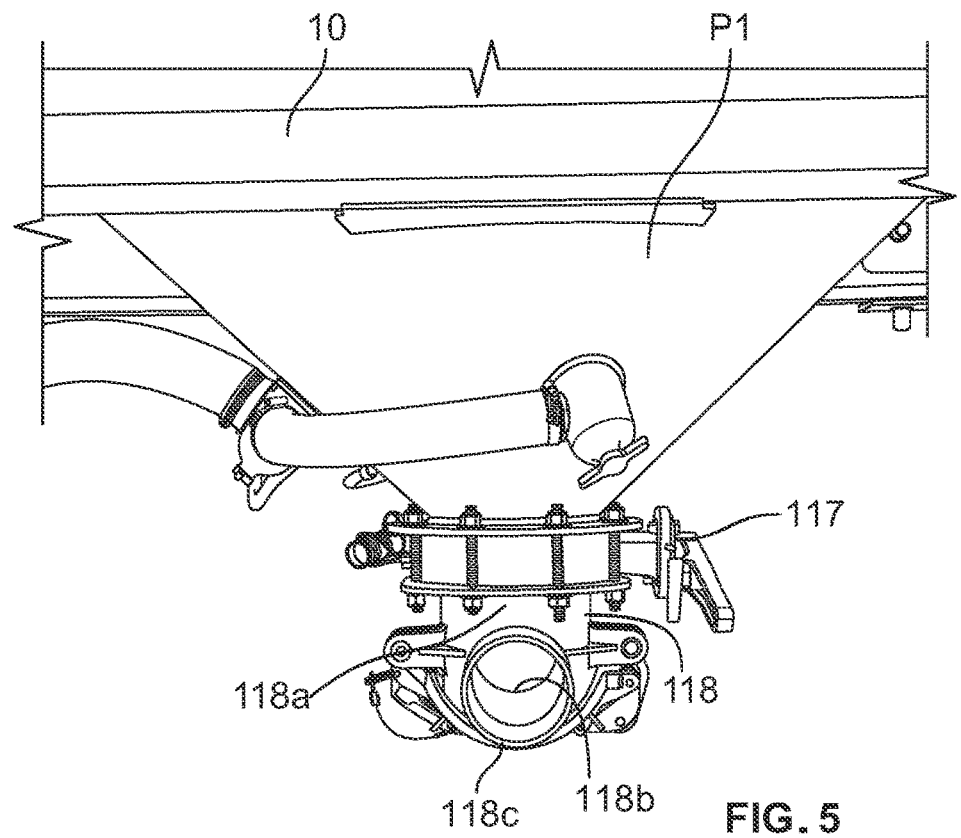
FIGS. 5 and 6 are elevational side and perspective view, respectively, of an exemplary embodiment of a T-connector useful in the present invention.
Figure 6:
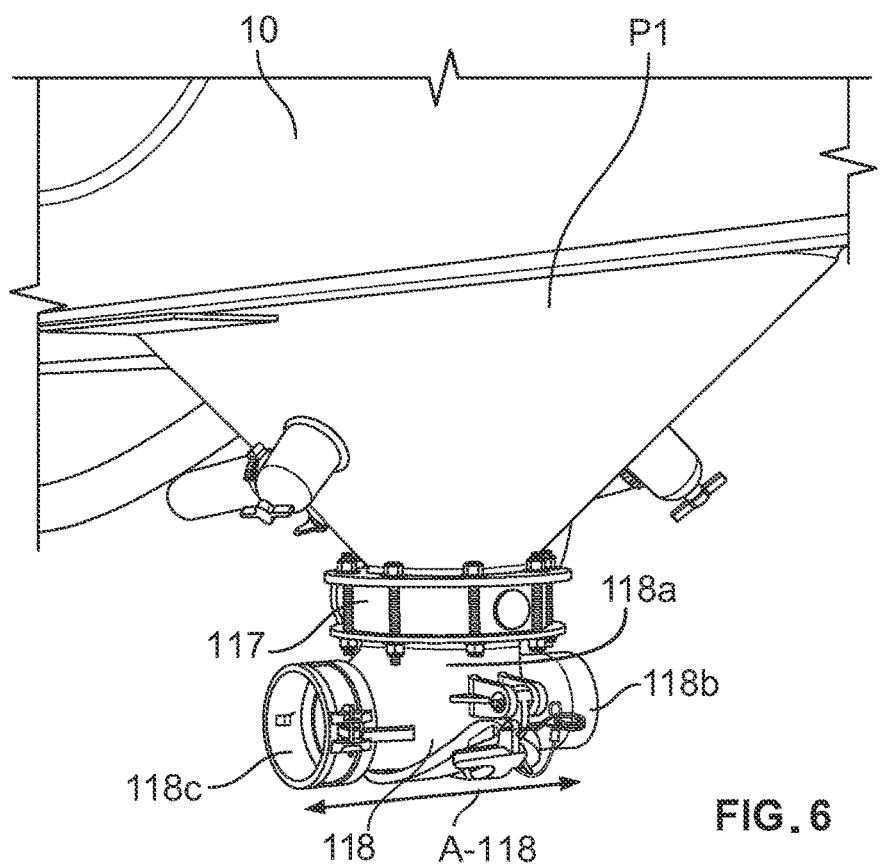

It is noted that the T-connectors 118, 120, 122 suitable for use with the apparatus and method of the present invention are configured similarly to those shown and described above in connection with conventional methods of the prior art (see FIG. 1B), insofar as each T-connector 118 (see FIGS. 5 and 6) has a flanged intake 118*a*, for connecting to an outlet 12 of a respective compartment or pod P1, and a pair of opposing arms 118b, 118c which define its axis (not clearly visible in FIG. 5 due to orientation, but see arrow A-118 in FIG. 6).

Figure 7:
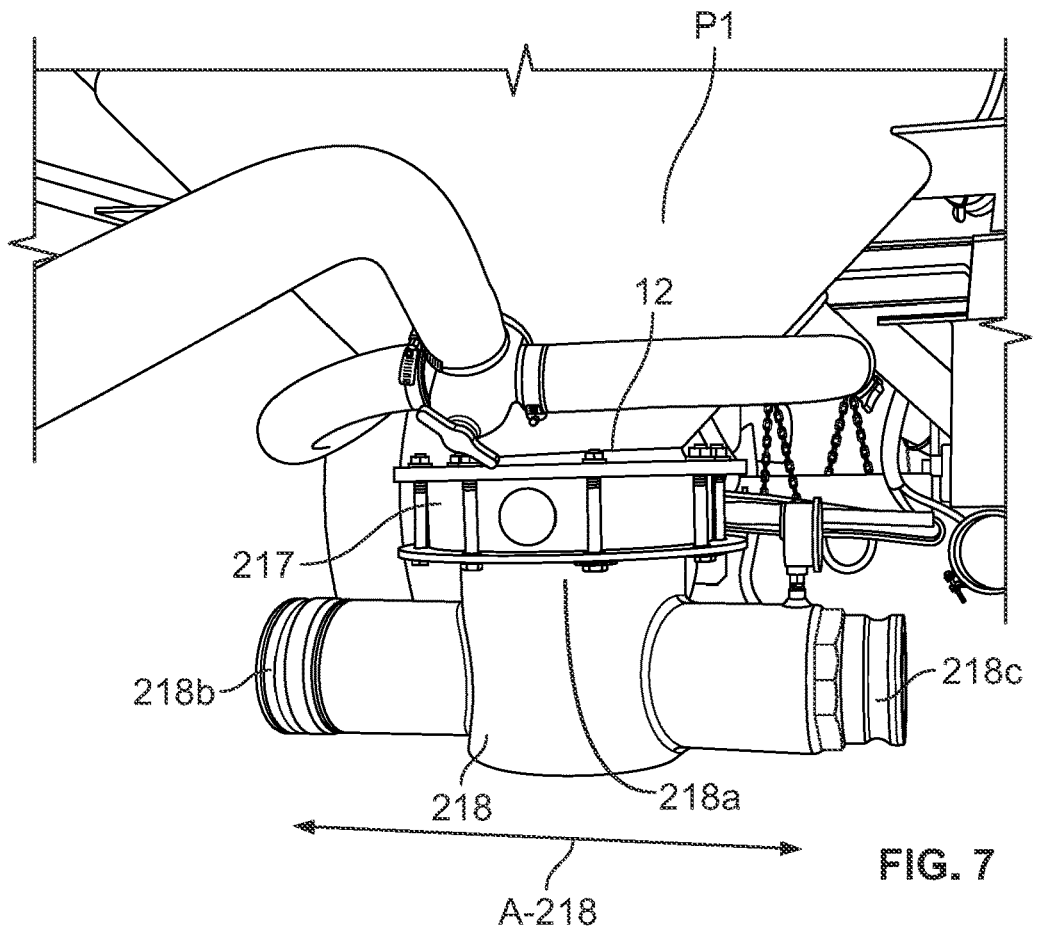
FIGS. 7 and 8 are elevational front and perspective views, respectively, of an alternative exemplary embodiment of a T-connector useful in the present invention.
Figure 8:
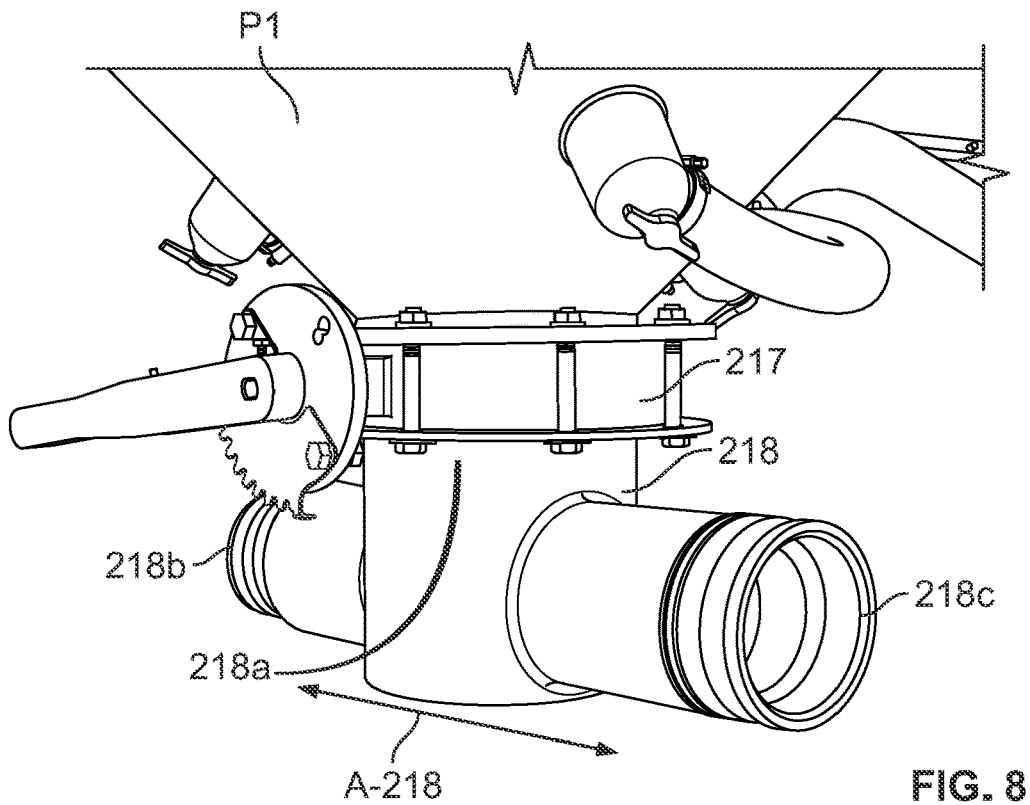

Another embodiment of T-connectors suitable for use with the method and apparatus of the invention described and contemplated herein is shown in FIGS. 7 and 8. Such alternative T-connectors 218 also have a flanged intake 218a, for connecting to the outlet 12 of a respective compartment P1, as well as a pair of opposing arms 218b, 218c which define its axis A-218.

As shown most clearly in FIGS. 3, 4, 4A, and 9, each of the T-connectors 118, 120, 122 is connected (with a respective valve 117, 119, 121) to a respective outlet 12, 14, 16 of the tank 10, but unlike conventional methods and apparatus, each of the T-connectors 118, 120, 122 is oriented with its axis (A-118, A-120, A-122) aligned either perpendicularly or obliquely (i.e., not parallel) with the length L of the tank trailer TT. In the exemplary embodiment shown in FIGS. 3, 4 and 4A, each T-connector 118, 120, 122 is connected to the tank 10 (a respective outlet 12, 14, 16 not visible in FIG. 4A), in a configuration wherein the axis A-118, A-120, A-122 of each T-connector 118, 120, 122, respectively, is oriented perpendicularly to the length L of the tank trailer TT.

Figure 4A:
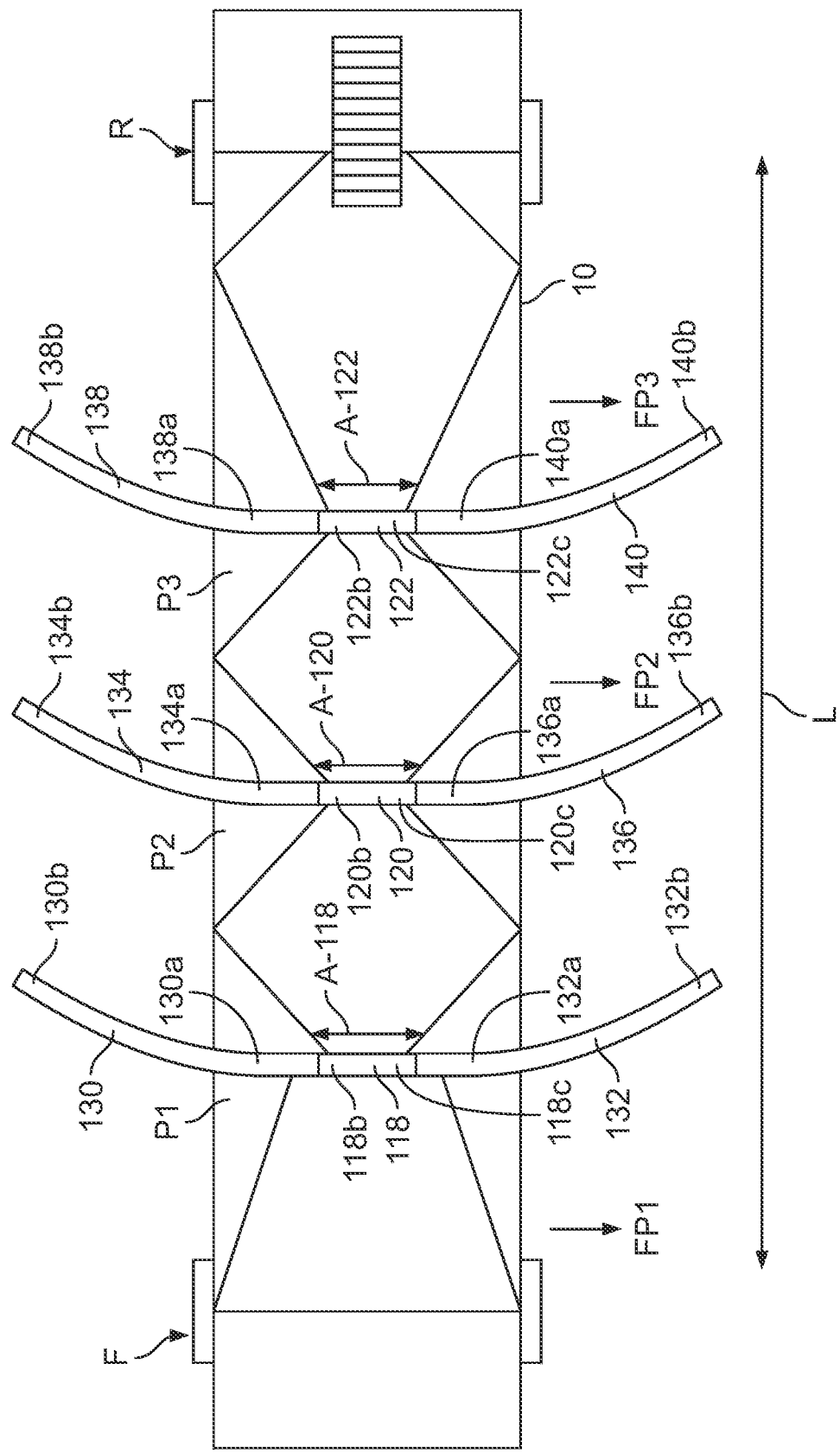
FIG. 4A is a schematic sketch of a tank trailer of FIGS. 3 and 4 showing conduits connected to the T-connectors.

FIG. 4A provides a schematic bottom view of the tank trailer TT, in the foregoing configuration where the T-connectors 118, 120, 122 are connected to respective outlets 12, 14, 16 (not visible, but see FIGS. 3, 4) of the tank 10 with their axes A-118, A-120, A-122 oriented perpendicularly to the length of the tank trailer TT. Additionally, as shown in the schematic bottom view of FIG. 4A, to enable offloading of cargo from the tank trailer TT, a plurality of blower conduits (for example first, second and third blower conduits 130, 134, 138 shown in FIG. 4A) are each connected at a first end 130a, 134a, 138a thereof to a first arm 118b, 120b, 122b of corresponding T-connectors 118, 120, 122, so that all of the first, second and third blower conduits 130, 134, 138 extend away from the tank 10 on the same (e.g., first) side of the tank trailer TT.

Figure 10:
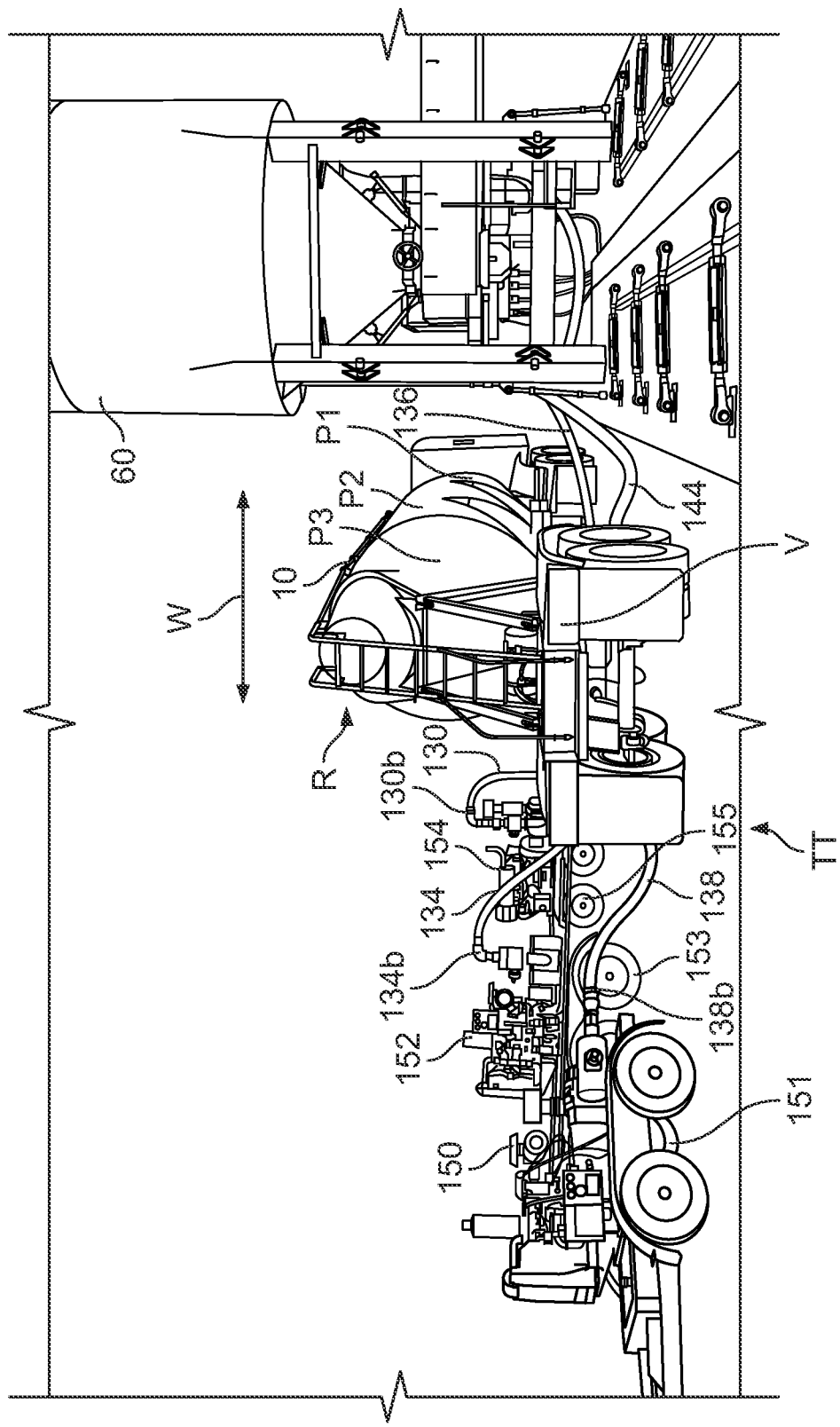
FIG. 10 is a is a schematic rear perspective view of the tank trailer apparatus and method of FIG. 9, showing blower and discharge conduits connected to the tank and blowers connected to blower conduits.
Figure 11:
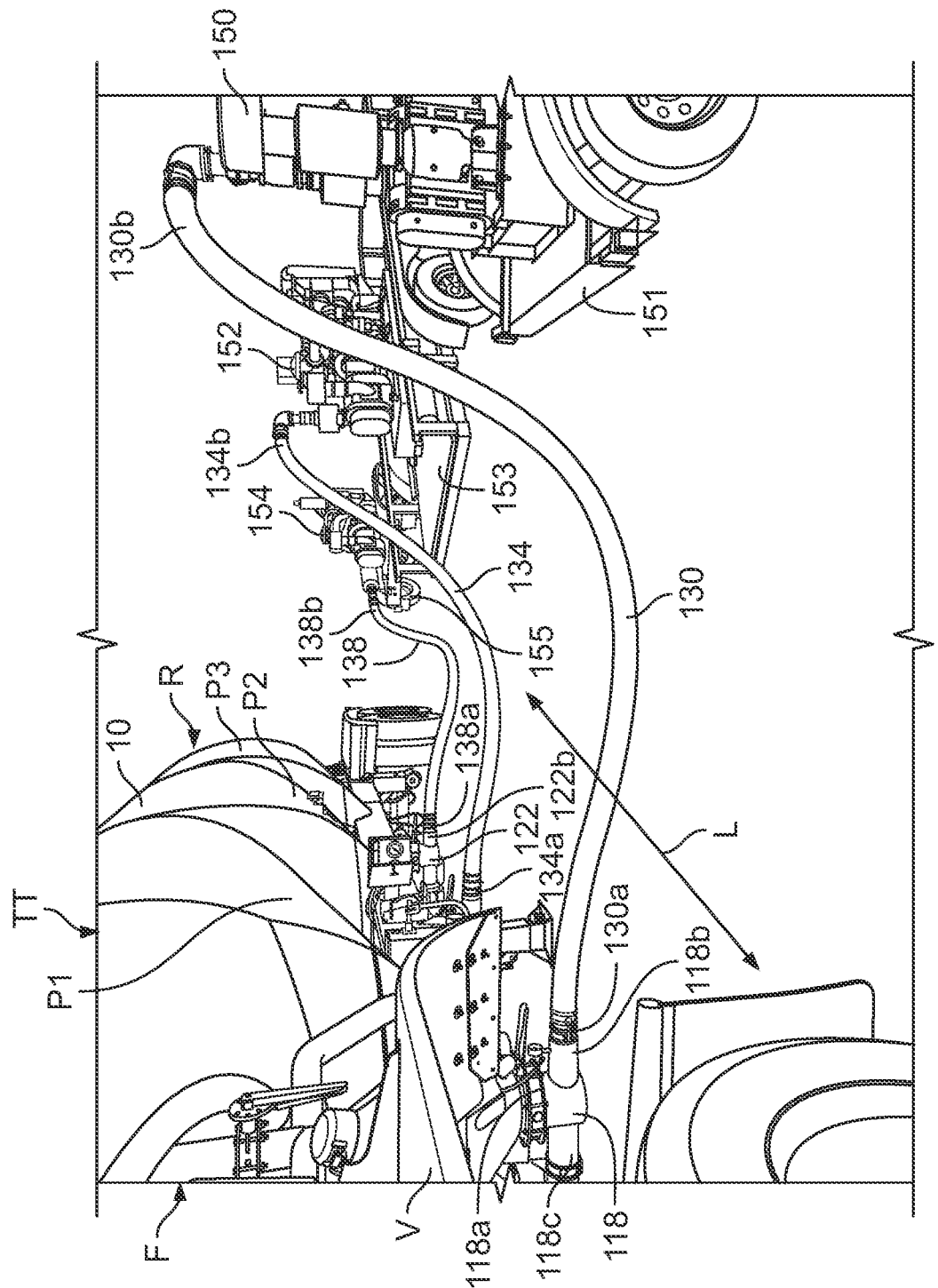
FIG. 11 is a schematic perspective view of the tank trailer of FIGS. 9 and 10, showing the blower conduits connected to T-connectors and blowers.

Furthermore, the first, second and third blower conduits 130, 134, 138 are connected at their opposite ends 130b, 134b, 138b to two or more blowers. As shown in FIGS. 10 and 11 for example, in some embodiments, each of the first, second and third blower conduits 130, 134, 138 is connected at its opposite end 130b, 134b, 138b to a respective one of three blowers 150, 152, 154. Generally, more than one blower (e.g., two to six) is used in accordance with the present invention, and preferably one blower is used for each outlet and associated T-connector. It is within the ability of persons of ordinary skill in the relevant art to select blowers of suitable type and capacity. In some exemplary embodiments, suitable blowers are capable of providing 250 to 1300 cubic feet per minute (CFM) air flow, have a revolutions per minute (RPM) range of about 1000-3000, are capable of providing continuous pressure up to 20 pounds per square inch (psi) and delivering up to 17 inches mercury ("Hg) of vacuum. Such blowers are, for example, commercially available at least from Tuthill of Springfield, Mo., U.S.A. as models T855 and T1055, and other blowers having similar or other suitable operating capacity, as determinable by persons of ordinary skill, would also be suitable for use in the present invention.

Figure 12:
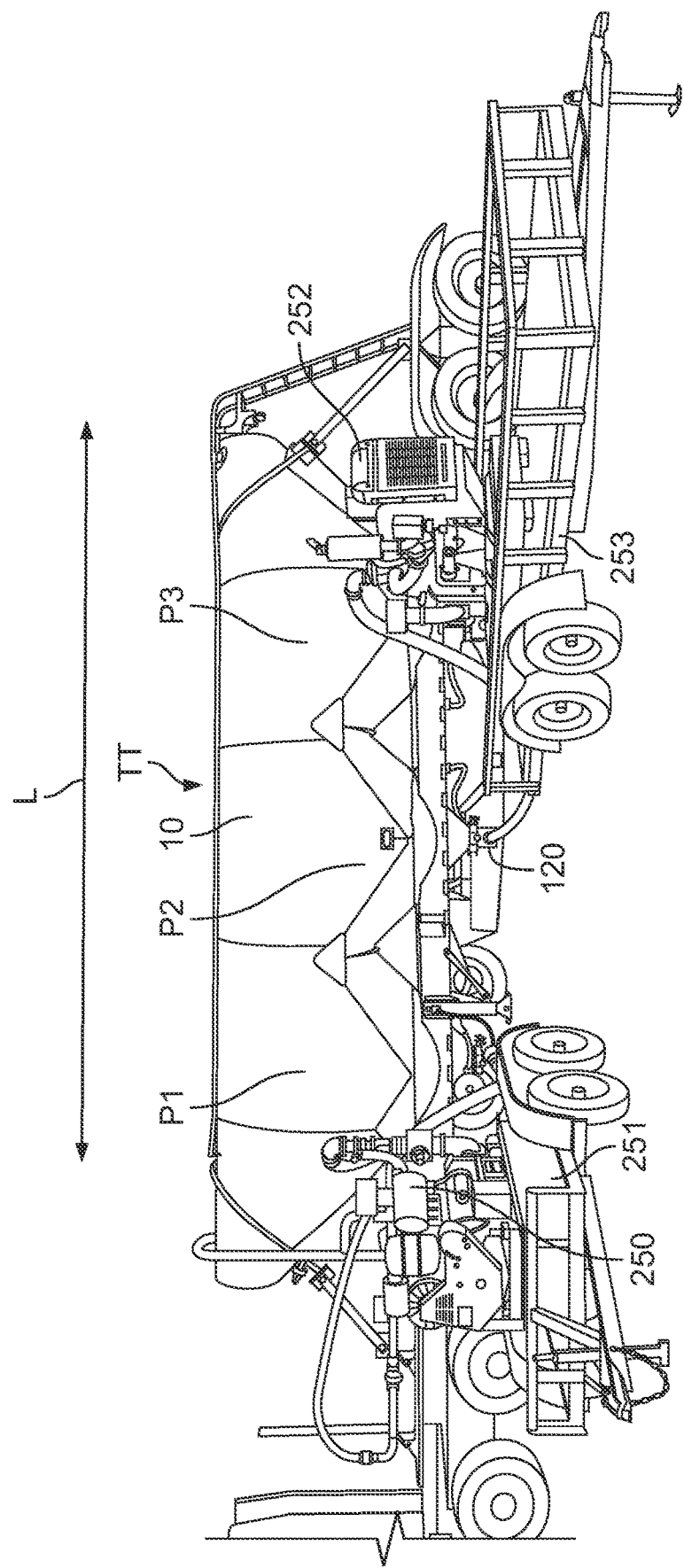
FIG. 12 is a schematic drawing of a tank trailer apparatus in accordance with the present invention, wherein blower conduits were connected to T-connectors and blowers.

It is noted that, rather than being mounted on the truck chassis TC (or vehicle frame V) with the tank 10 as in the prior art, each of the blowers 150, 152, 154 is instead mounted on its own portable cart, trailer, dolly, or other wheeled conveyance (e.g., see the trailers 151, 153, 155 upon which the blowers 150, 152, 154, respectively are mounted in FIGS. 10-12). It is noted that one benefit provided by mounting each blower 150, 152, 154 on its own dedicated wheeled conveyance 151, 153, 155 is that the weight of the blower(s) 50, 150, 152, 154 and their associated apparatus (hoses, mounting frames, etc.) is taken off of the truck chassis TC (and tank trailer TT). This allows a truck to carry more cargo without exceeding weight limits imposed by highway authorities. The highway weight limits often prevent the trucks from utilizing their full cargo capacity (i.e., with respect to volume of the tank 10) and carrying the greatest possible amount of cargo. Additionally, in cases where a blower (50, 150, etc.)) would have been mounted to the vehicle frame V, elimination of the blower, would also provide more room on the tank trailer TT for a larger capacity (volume) tank 10 and compartments P1, P2, P3, which of course would also increase the capacity of the tank trailer 10 and overall truck.

As also shown in FIG. 4A, a plurality of discharge conduits (for example first, second and third discharge conduits 132, 136, 140 shown in FIG. 4A) are each connected at a first end 132a, 136a, 140a thereof to a second arm 118c, 120c, 122c of corresponding T-connectors 118, 120, 122, so that all of the first, second and third discharge conduits 132, 136, 140 extend away from the tank 10 on the same (e.g., second) side of the tank trailer TT, which is opposite the first side from which the blower conduits 130, 134, 138 extend. Furthermore, opposite (i.e., second) ends 132b, 136b, 140b of each of the first, second and third discharge conduits 132, 136, 140 is connected, or positioned proximate to one or more discharge points.

In one exemplary embodiment, the one or more discharge points include several (e.g., three) discharge points, all of which actually discharge into the same silo 60. For example, without limitation, a single silo 60 may have multiple, e.g., three, inlet ports (not shown) for receiving cargo offloaded from the tank trailer TT of a truck. In such cases, each of the first, second, and third discharge conduits 132, 136, 140 is connected by its opposite end 132b, 136b, 140b to a respective one of each of the inlet ports of the single silo 60. The foregoing arrangement of the T-connectors 118, 120, 122 and discharge conduits 132, 136, 140 allows cargo to flow from the tank 10 concurrently along multiple flow paths (see arrows FP1, FP2, FP3 in FIG. 4A) and in multiple cargo streams (e.g., through the three discharge conduits 132, 136, 140, respectively, as in the exemplary embodiments shown in FIGS. 4A and 10) into the same silo 60. This accelerates the rate of cargo discharged from the tank 10 and significantly shortens the total cargo offloading time. Applicants surprisingly found that the apparatus and method of the present invention reduced total offloading time for sand cargo from a pneumatic tank trailer from a conventional 45 minutes to less than about 15 minutes, since all three compartments (pods) were offloaded concurrently.

In another exemplary embodiment, the one or more discharge points include a separate discharge point for each of the first, second, and third discharge conduits 132, 136, 140. For example, without limitation, each of the first, second, and third discharge conduits 132, 136, 140 is connected by its opposite end 132b, 136b, 140b to a different one of three silos 60, 62, 64 (see, e.g., FIG. 9). The foregoing arrangement of the T-connectors 118, 120, 122 and discharge conduits 132, 136, 140 allows cargo to flow from the tank 10 concurrently along multiple flow paths (see arrows FP1, FP2, FP3 in FIG. 4A) and in multiple cargo streams (e.g., through the three discharge conduits 132, 136, 140, respectively, as in the exemplary embodiments shown in FIGS. 4A and 10). This embodiment also provides acceleration of the rate of cargo discharged from the tank 10 and significantly shortens the total cargo offloading time.

As will be recognized by persons or ordinary skill in the relevant art, several modifications and alternative embodiments are possible for the apparatus and method for offloading cargo comprising one or more flowable materials from a tank trailer. For example, the tank may include only two interior compartments and, therefore, only two outlets, with one T-connector for each outlet.

In some embodiments, for example without limitation, the tank may include four interior compartments and, therefore, four outlets, with one T-connector for each outlet. In embodiments where the tank has three or more interior compartments, with a corresponding number of outlets and T-connectors, at least two blowers may be employed with one or two T-connectors connected to each of the blowers by a suitable number of conduits. For example, as shown in FIG. 12, first and second blowers 250, 252 may be used in a system to offload cargo from a tank 10 having three interior compartments P1, P2, P3 (and the associated three outlets with a corresponding one of three T-connectors connected thereto), so that one of the outlets and its T-connector are connected by a conduit to one of the blowers 250, while the other two outlets and their T-connectors are connected to the other blower 252 by at least two conduits (e.g., as by using a manifold connector, or separate outlets provided on the same blower 252). Each of the first and second blowers 250, 252 is mounted on its own portable trailer 251, 253.

It is further contemplated that, in an alternative embodiment of the apparatus described herein which includes two or more blower conduits, a single blower could be used and all of the blower conduits attached thereto by their second ends. Similarly, instead of each discharge conduit delivering cargo directly to one or more discharge points, in another alternative embodiment of the apparatus described herein, two or more of the discharge conduits may be connected at their respective second ends to a single collection conduit, an end of which is connected or positioned proximate to a discharge point, or even to more than one discharge point. Is such an embodiment, each of the second ends of the two or more discharge conduits is indirectly connected or positioned proximate to the one or more discharge points. Additionally, in such embodiments, for example without limitation, the single collection conduit may have an inner diameter greater than the inner diameter of one or more of the discharge conduits, so as to minimize back pressure which may slow or impede flow of cargo through each of the discharge conduits and into the collection conduit.

An exemplary embodiment of the method in accordance with the invention as described and contemplated herein follows.
 (1) Truck arrives on location and comes to a stop parallel with silos (no more backing up, which means the process is safer)—as long as space on location allows.
 (2) Stationary/trailer-mounted blowers on location will provide top air and product line pressure needed to offload product from trailer, through the multiple, e.g., three, discharge points (faster offload will increase truck utilization)
 (3) Having blower on location allows us to remove equipment (weight) from both the truck and the trailer (allowing for increased cargo capacity)

In comparison, a typical conventional (prior art) method has been as follows.

(1) Arriving on location, truck pulls onsite and is "spotted" or backed into position next to a silo; perpendicular or at an angle, very seldom parallel
 (2) Once spotted, the hot hose is connected to the truck mounted blower;
 (3) Truck engine is then idled up to provide power to turn the blower;
 (4) Blower provides pressure to both the top air connection point and the product line;
 (5) Valves at the bottom of pods P1, P2 and P3 are opened to allow product to enter the pressurized product line at a teed connection point;
 (6) All product is moved through the product line, traveling along a single flow path, from front to back of the trailer, in a single product (cargo) stream, where the trailer is attached to silo via hose;
 (7) Process utilizes one blower and all product has to move through a single offloading point at the back of the trailer;
 (8) The process is also governed by maximum pressure limits (typically 12 psi).

It will be understood that the embodiments of the present invention described hereinabove are merely exemplary and that a person skilled in the art may make variations and modifications without departing from the spirit and scope of the invention. All such variations and modifications are intended to be included within the scope of the present invention.

We claim:

1. An apparatus for offloading cargo from a tank trailer to one or more discharge points, wherein the tank trailer has a front and, a rear end, a length extending from the front end to the rear end thereof, and a tank having at least two interior compartments for containing cargo therein, each of the at least two interior compartments having an outlet for allowing cargo to flow out therefrom and a valve connected to the outlet for controlling the flow of cargo through the outlet, the apparatus comprising:

at least two T-connectors, each of which has an axis, an intake and a pair of opposing arms in fluid communication with one another and the intake and wherein the pair of opposing arms defines the axis, each of the at least two T-connectors being connected by its intake to the outlet of a respective one of the at least two interior compartments, wherein each of the at least two T-connectors is oriented perpendicularly or obliquely relative to the length of the tank trailer;

two or more blower conduits, each of which has a first end and a second end, wherein a respective one of the two or more blower conduits is connected by the first end thereof to a first one of the pair of opposing arms of a respective T-connector, such that the two or more blower conduits all extend away from and on a first side of the tank;

at least one blower capable of providing air flow and pressure to the two or more blower conduits, each of which is connected by the second end thereof to the at least one blower for receiving and delivering the air flow and pressure to each of the two or more T-connectors; and two or more discharge conduits, each of which has a first end and a second end, wherein a respective one of the two or more discharge conduits is connected by the first end thereof, and in fluid communication with, a second one of the pair of opposing arms of a respective one of the two or more T-connectors, such that the two or more discharge conduits extend away from and on a second side of the tank which is opposite the first side of the tank.

2. The apparatus of claim 1, wherein each of the two or more discharge conduits concurrently receives and delivers a respective independent cargo stream along a respective independent flow path and to the one or more discharge points.

3. The apparatus of claim 1, wherein operation of the at least one blower causes the cargo to flow from each of the two or more interior compartments of the tank, concurrently, along multiple flow paths and in multiple cargo streams, to the one or more discharge points.

4. The apparatus of claim 1, wherein, when the one or more blowers provide air flow and pressure to the two or more blower conduits, cargo flows concurrently out of each of the at least two interior compartments of the tank, through each respective outlet thereof and valve connected thereto, and forms multiple cargo streams which flow concurrently along multiple flow paths, through the two or more discharge conduits and generally in a desired direction which is, at least initially, perpendicular or oblique relative to the length of the tank.

5. The apparatus of claim 1, wherein the at least two interior compartments comprise at least: a frontmost interior compartment which is proximate to the front of the tank trailer and has a foremost outlet, a rearmost interior compartment which is proximate to the rear of the tank trailer and has a rearmost outlet, and either one or more intermediate interior compartments located between the frontmost and rearmost interior compartments and each of which has a respective intermediate outlet, or no intermediate compartments; and the two or more T-connectors comprise at least: a frontmost T-connector which is connected to the frontmost outlet of the frontmost interior compartment, a rearmost T-connector which is connected to the rearmost outlet of the rearmost interior compartment, and, when one or more intermediate interior compartments are present, one or more intermediate T-connectors, each of which is connected to the intermediate outlet of a respective one of the one or more intermediate interior compartments.

6. The apparatus of claim 1, wherein the tank trailer includes a truck chassis and the at least one blower is mounted to the truck chassis.

7. The apparatus of claim 1, wherein the second end of each of the two or more discharge conduits is, directly or indirectly, connected or positioned proximate to the one or more discharge points.

8. The apparatus of claim 7, wherein the one or more discharge points are selected from a silo, a building, a selected location on or in the ground, another tank trailer, a container, a vessel, and combinations thereof.

9. The apparatus of claim 1, wherein the second ends of all of the two or more discharge conduits are, directly or indirectly, connected or positioned proximate to a single discharge point.

10. The apparatus of claim 9, wherein the one or more discharge points comprise two or more discharge points, and wherein the second end of each of the two or more discharge conduits is, directly or indirectly, connected or positioned proximate to the two or more discharge points, which may be the same or different from one another.

11. The apparatus of claim 1, wherein the at least one blower is mounted on a wheeled conveyance.

12. The apparatus of claim 11, wherein the at least one blower comprises two or more blowers, each of which is mounted on a respective separate wheeled conveyance.

13. A method for offloading cargo from a tank trailer to one or more discharge points, wherein the tank trailer is positioned proximate to the one or more discharge points, using the apparatus according to claim 1, the method comprising the steps of:
provding power to the at least one blower and causing the at least one blower to provide air flow and pressure to the two or more blower conduits and the two or more discharge conduits;
opening each of the two or more valves to allow cargo to flow out of each of the at least two interior compartments, through each respective outlet thereof and valve connected thereto, whereby multiple cargo streams are formed and flow concurrently along multiple flow paths, through the two or more discharge conduits, and generally in a desired direction which is, at least initially, perpendicular or oblique relative to the length of the tank, whereby each of the multiple cargo streams is delivered concurrently to the one or more discharge points.

14. The method of claim 13, wherein the second end of each of the two or more discharge conduits is, directly or indirectly, connected or positioned proximate to the one or more discharge points.

15. The method of claim 13, wherein operation of the at least one blower causes the cargo to flow from each of the two or more interior compartments of the tank, concurrently, along multiple flow paths and in multiple cargo streams, to the one or more discharge points.

16. The method of claim 13, wherein the second ends of all of the two or more discharge conduits are, directly or indirectly, connected or positioned proximate to a single discharge point and all of the multiple cargo streams are delivered to the single discharge point.

17. The method of claim 13, wherein the one or more blowers provide air flow and pressure to the two or more blower conduits, cargo flows concurrently out of each of the at least two interior compartments of the tank, through each respective outlet thereof and valve connected thereto, and forms multiple cargo streams which flow concurrently along multiple flow paths, through the two or more discharge conduits and generally in a desired direction which is, at least initially, perpendicular or oblique relative to the length of the tank.

18. The method of claim 13, wherein the at least two interior compartments comprise at least: a frontmost interior compartment which is proximate to the front of the tank trailer and has a foremost outlet a rearmost interior compartment which is proximate to the rear of the tank trailer has a rearmost outlet, and either one or more intermediate interior compartments located between the frontmost and rearmost interior compartments and each of which has a respective intermediate outlet, or no intermediate compartments; and the two or more T-connectors comprise at least: a frontmost T-connector which is connected to the frontmost outlet of the frontmost interior compartment, a rearmost T-connector which is connected to the rearmost outlet of the rearmost interior compartment, and, when one or more intermediate interior compartments are present, one or more intermediate T-connectors, each of which is connected to the intermediate outlet of a respective one of the one or more intermediate interior compartments.

19. The method of claim 13, wherein the at least one blower is mounted on a wheeled conveyance.

20. The method of claim 19, wherein the at least one blower comprises two or more blowers, each of which is mounted on a respective separate wheeled conveyance.

* * * * *